United States Patent [19]

Jehmlich et al.

[11] Patent Number: 4,465,520

[45] Date of Patent: Aug. 14, 1984

[54] METHOD AND APPARATUS FOR THE REMOVAL OF OBJECTIONABLE VOLATILE COMPOUNDS FROM HOT GASES

[75] Inventors: Rolf Jehmlich, Cologne; Horst Herchenbach, Troisdorf, both of Fed. Rep. of Germany

[73] Assignee: Klockner-Humboldt-Deutz A.G., Fed. Rep. of Germany

[21] Appl. No.: 468,691

[22] Filed: Feb. 28, 1983

Related U.S. Application Data

[63] Continuation of Ser. No. 251,057, Apr. 6, 1981, abandoned.

[30] Foreign Application Priority Data

Apr. 30, 1980 [DE] Fed. Rep. of Germany ....... 3016642

[51] Int. Cl.$^3$ .............................................. C04B 7/36
[52] U.S. Cl. .................................... 106/100; 106/102; 106/103
[58] Field of Search ...................... 106/100, 102, 103; 432/16

[56] References Cited

U.S. PATENT DOCUMENTS

| 2,687,290 | 8/1954 | Garoutte et al. | 106/100 |
| 2,871,133 | 1/1959 | Palonen et al. | 106/100 |
| 4,001,030 | 1/1977 | Watson et al. | 106/103 |
| 4,161,411 | 7/1979 | Sell et al. | 106/103 |

Primary Examiner—James Poer
Attorney, Agent, or Firm—Hill, Van Santen, Steadman & Simpson

[57] ABSTRACT

Method and apparatus for removing objectionable volatile compounds from hot gases such as those produced during the manufacture of cement wherein the hot gases containing such volatiles are cooled to the extent that at least a portion of such compounds are condensed into a powdery, solid form. These very fine particles are collected along with cement particles and consolidated as by means of roll presses into coherent solid shapes of larger area which can be used, for example, as fertilizer pellets.

8 Claims, 1 Drawing Figure

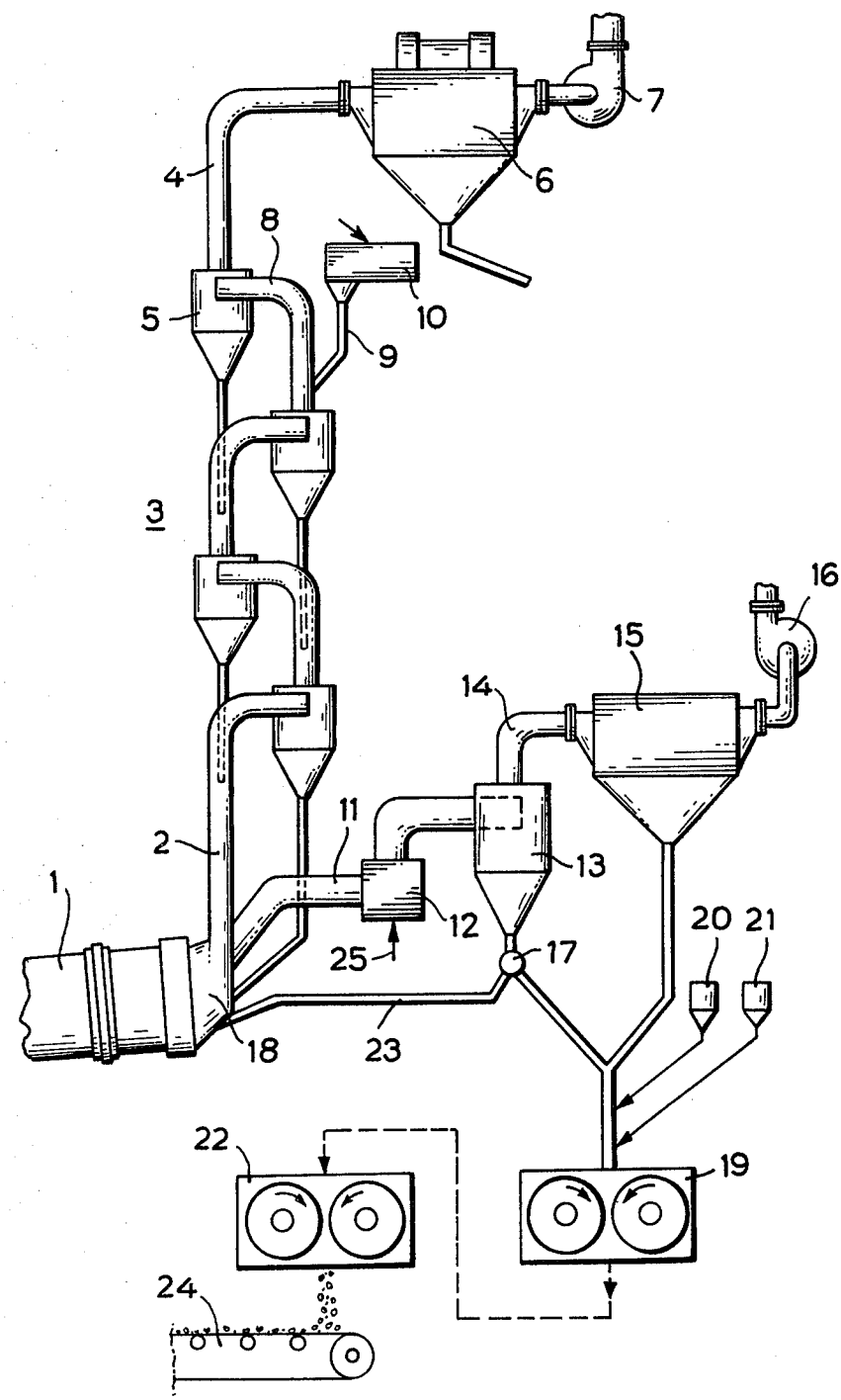

METHOD AND APPARATUS FOR THE REMOVAL OF OBJECTIONABLE VOLATILE COMPOUNDS FROM HOT GASES

This is a continuation of application Ser. No. 251,057, filed Apr. 6, 1981, now abandoned.

BACKGROUND OF THE INVENTION

1. Field of the Invention

This invention is in the field of method and apparatus for removing objectionable, volatile compounds from hot gas streams and involves cooling such streams to cause precipitation of the volatile materials along with mineral particles, and then consolidating the mixture into solid shapes.

2. Description of the Prior Art

In the technology of cement manufacture, the problem of alkali concentration is of particular importance in two respects. For one, it has been recognized that even low quantities of alkali oxides in the cement lead to disturbances in the setting properties. For another, in modern cement installations which use suspension gas drying, there is particular difficulty due to high alkali content in the raw granular material for cement. This difficulty lies not only in an altered flow behavior of the raw granular material in the heat exchanger, but also because of incrustations and formations of deposits in the passages from the furnace and the heat exchanger system. As a result, a satisfactory regulation of the furnace heat exchanger installation is not possible.

SUMMARY OF THE INVENTION

The present invention seeks to avoid the disadvantages of the prior art by removing the volatile alkali, chlorine, or sulfur compounds contained in the exhaust gases of cement installations from such gases and to treat them to render them non-harmful to the environment without large additional investments in capital expenditures.

In accordance with the present invention, the gases to be treated are cooled down directly or indirectly until at least a portion of the undesired substances are condensed into powdery, solid form and these dust particles along with the mineral particles from the cement constituents are separated from the gases. Following this, the mixture of condensed particles and cement constituents are consolidated or compressed by means of pressure rolls. The advantage of this technique lies in the fact that the damaging volatile constituents contained in the hot gases can be separated out and processed without great additional investment outlay in such a manner that the end product is transportable without the development of dust, and can be stored safely in heaps. It has surprisingly been discovered that the dusts which are thus condensed and preferably briquetted during storage under environmental conditions display a very good age-hardening of the outer shell of the briquette. A disintegration of the briquette by environmental influences such as wind or rain is thus minimized.

In a preferred form of the present invention, the dusts and/or cement particles are separated from the gases in a particle size smaller than 200 microns and then they are briquetted. It has been found that the use of particle sizes within this range favors the consolidation and age-hardening of the outer shell of the finished pressed objects.

In another form of the invention, the consolidation takes place by means of briquetting rolls which have molding cavities on their peripheries to produce briquettes of equal size. The compressed briquettes have good stacking properties, which is an advantage when such briquettes have to be stored for long periods of time.

It is also possible to consolidate the materials by means of pairs of smooth surface rolls to shape the particles into plate-like objects. The product of this procedure can be used in the fertilizer industry as fertilizer pellets.

In accordance with the present invention, the briquetting can proceed with or without a binder depending on the characteristics of the substances which are separated out from the gases. When applicable, a binder such as molasses, sulfide waste liquor, or other supplementary additions which are suitable for the ultimate use can be made. For example, potassium nitrate or ureas can be added where the finished product is to be used in the fertilizer industry.

The briquetting operation may take the form of a plurality of stages of briquetting rolls. This is particularly advantageous when a dry condensation of the substances to be compressed is to take place without the presence of a binder.

It is also possible to moisten the dust and the cement particles before the briquetting operation, depending on the mineral constituents. When moisture is added, a more rapid compaction of the substances can be achieved and the solidifying of the pressed objects begins immediately. The briquettes or platelets produced according to the present invention may have the following chemical composition:

Chloride (as Cl)—Approximately 3 to 20% by weight
$SO_2$ and $SO_3$, total—Approximately 2 to 20% by weight
$K_2O$—Approximately 5 to 30% by weight
$Na_2O$—Approximately 2 to 20% by weight The remaining constituents adding up to 100% consist of raw granular components from cement, and may include $Al_2O_3$, $CaO$, $Fe_2O_3$, and $SiO_2$. With a chemical composition of this sort, the pressed objects produced in the form of briquettes or platelets harden quickly on the surface since the alkali oxides react with the carbon dioxide of the surrounding air to form alkali metal carbonates. The solidification of the briquettes or platelets is speeded up and thereby improved by means of the addition of water so that the calcium oxide contained in the briquettes or platelets is slaked. Point compressive strengths of 1000 N to 2000 N can be obtained. The solidified and surface-hardened briquettes or platelets exist in easily storable, easily transportable lump sizes and can, for example, be used directly as a fertilizer material after suitable grinding.

The invention is also concerned with an apparatus for carrying out the method. Specifically, we provide an apparatus for cooling of the gases exiting from the rotary kiln. The gas cooling device is followed by one or more separators which remove the fine and coarse particles which are damaging to the cement installation. Following the separating devices, there is an apparatus for consolidating the separated dusts and/or cement particles preferably consisting of one or more roll presses. The briquetting of the dusts and/or cement particles can proceed directly as they are separated out of the cement installations so that no special transport devices are needed and the finished briquettes can be loaded like any other storable material, transported and deposited.

The separating device preferably consists of at least two pieces of separating apparatus. In the first separator, in the direction of flow of the gas, separation of the coarser cement particles with a lower alkali chloride and/or sulfate content takes place while in the second separator, which is preferably an electrical precipitator, the finer dusts with a higher alkali chloride and/or sulfate content are separated out. In this manner, substances with different chemical constituents can be briquetted separately whereby the briquettes or platelets consisting of dusts which contain a very high proportion of alkalis can be used in the fertilizer industry while other briquettes containing a higher amount of the cement-making constituents can be returned to the cement kiln.

We may provide a distributor device which directs the very finely divided particles to the consolidating apparatus, and returns the coarser particles to the cement installation. A precisely desired composition of chemical constituents of the pressed object can thereby be maintained. It is, therefore, possible to control the surface hardness or the solidification of the pressed objects by means of adjustment of the percentage portion of alkali oxides or of hydraulic components.

In the preferred form of the invention, the consolidation device consists of a series of several roll presses so that particularly in the case of dry compaction, briquetting or platelet formation can be effectively achieved.

DESCRIPTION OF THE PREFERRED EMBODIMENTS

The single FIGURE in the drawings illustrates rather schematically a cement-making installation which makes use of the improvements of the present invention.

The system shown in the drawing includes a rotary kiln 1 which is connected by means of a furnace exhaust gas line 2 with a multistage heat exchanger 3 consisting of a plurality of cyclone type heat exchangers.

A heat exchanger exhaust gas line 4 of the uppermost cyclone 5 of the heat exchanger system 3 is connected with a dust separating device 6 which may, for example, be an electrical precipitator. An exhaust gas blower 7 is connected to the electrical precipitator 6. A material supply line 9 feeds raw material from a delivery device 10 into the pre-heating stages of the heat exchanger. A gas conduit 8 is connected to the material supply line 9 and carries the raw material into the uppermost cyclone 5 of the heat exchanger.

In the vicinity of the exhaust passage from the rotary kiln 1 to the furnace exhaust gas line 2 there is a bypass line 11 which feeds a gas cooling device 12. The cooling device is, in turn, connected to a separation cyclone 13. On the exhaust gas side of the separation cyclone there is a gas line 14 connecting the cyclone with an electrical precipitator 15 functioning as a second separator. Following the electrical precipitator 15 there is an induced draft blower 16 for conveying the bypass gases.

The discharge of the separating cyclone 13 which contains the coarser particles is connected by means of a distributor device 17 and a line 23 with an intake 18 of the rotary kiln 1 and a pair of roll presses 19. The discharge from the electrical precipitator 15 is also directed to the roll press 19. The roll press arrangement 19 is also fed by feed devices 20, 21 for water and/or binder. The discharge of the roll press device 19 is connected to another compaction device 22 which may also be a pair of counter-rotating smooth surface pressure rolls. Beyond the roll press device 22 there is a conveyor 24 for transporting the finished pressed objects to a loading station or to some other storage place. The compacting pressures at the rolls can be set at a value up to about 6 metric tons per centimeter of roll width, utilizing a roll surface velocity of up to 0.8 meters/sec.

In the operation of the cement producing installation, for example, an alkali-rich raw material containing the cement components is introduced by means of the delivery device 10 and the feed line 9 into the gas line 8 which is connected to the uppermost cyclone 5 of the heat exchanger 3. The hot furnace gases are conveyed through the heat exchanger by the induced draft blower 7. The fine granular cement raw material in the gas line 8 is carried along by the hot gases and separated in the uppermost cyclone 5. The separated material is introduced into a gas line feeding the next lower cyclone, and so on. The raw material thus passes through the heat exchanger system in countercurrent relation to the hot gases and is thereby pre-heated in several stages. It is also partially calcined and is finally introduced from the lowest cyclone of the heat exchanger 3 directly into the rotary kiln 1 where it is converted into cement clinkers.

In the rotary kiln 1, the constituents of the granular cement such as alkalis, chlorine and sulfur are quantitatively volatilized in the high temperature prevailing in the kiln and, together with the hot gases, enter the heat exchanger 3. In the heat exchanger, these constituents which were volatilized in the hot furnace gases come into contact with the granular cement which is pre-heated but comparatively colder and with the gas-carrying installation parts which also have comparatively lower temperatures. Because of the chemical reactions and the physical processes occurring, the volatilized material constituents condense on the cement particles. The danger thus exists that the finely divided cement meal will form undesired agglomerates. The volatilized material constituents can also condense directly on the gas-carrying installation parts to slowly clog the parts and prevent a properly controllable furnace operation.

In order to avoid this condition according to the present invention, furnace gases are drawn off by means of the bypass line 11 where the concentration of the volatile, damaging constituents is especially high. These bypass gases are directed into the cooling device 12 and are there cooled down by means of cooling air introduced through a line 25. The cooling air is introduced to such a large extent that the volatile damaging constituents are converted directly into a non-damaging solid crystalline form and are present in the bypass gases in the manner of an aerosol. These bypass gases contain, in addition to the harmful dusts, certain portions of cement particles. The gases containing these dusts and the cement particles after cooling are directed into the separating cyclone 13 which is designed such that the coarser cement particles having a lower alkali chloride or sulfate content are separated out. The finer bypass dusts which are not yet separated from the gases and display a higher alkali chloride or sulfate content are delivered with the gases from the cyclone 13 by means of a line 14 to the electrical precipitator 15 where they are separated out to a large extent, at least up to 95%. These particles have sizes less than about 200 microns. The gases cleaned in this manner are then directed by means of the induced draft blower 16 into the surroundings and no longer represent a threat to the surroundings.

At least a portion of the coarser cement particles separated in the cyclone 13 together with the finer by-pass dusts separated in the electrical precipitator 15 are directed to a consolidation device such as the roll presses 19 and 22 operating in series. The other portion of the coarser cement particles separated from the gases in the cyclone 13 can, depending upon the amount of alkali chlorides, be directed back by means of the distributor device 17 into the rotary kiln 1 after intermediate storage, if necessary. By means of the feed devices 20, 21, water sufficient to form a moisture content of 5% to 10% and molasses may be added as binders to the dusts and cement particles which are fed to the roll press 19. The combination of binders and particles are then compressed in the nip between the counter-rotating rolls of the roll press 19 into consolidated, platelike pressed objects.

In the form of the invention shown in the drawing, a two-stage compression is undertaken such that the platelets exiting from the press 19 are passed through the nip of a second pair of counter-rotating rolls in the roll press 22 where they are again compressed. The compacted objects can then be directed to an open conveyor belt and passed to a loading station or a waste dump which is not shown in the drawings.

The platelets produced according to the present invention may contain, for example, 27% $K_2O$, 1.4% $Na_2O$, 8.4% chloride, and 19% $SO_3$, with the remaining constituents being clinker components such as CaO, $Al_2O_3$, $Fe_2O_3$ and $SiO_2$. They have a density below 2.7 grams/cc. The composition of the platelets displays characteristics suitable to make them useful in the fertilizer industry. They have an immediate solidity of 300 to 500 N and after four days have a solidity of 1000 to 2000 N. They are storable in the open even for rather long periods of time without burdening the environment since they do not develop dust nor do they disintegrate under environmental influences. With this type of chemical composition, a grinding operation is effective to make a product which is employed directly as a fertilizer. In the event that the amount of alkali constituents, particularly the amount of potassium, should not be sufficient for use as fertilizer, then the product can be used as a filler in road construction or can be otherwise used in the building materials industry.

It should be evident that various modifications can be made to the described embodiments without departing from the scope of the present invention.

We claim as our invention:

1. A method for the removal and consolidation of objectionable volatile compounds from hot gases containing cement raw meal particles of varying sizes and produced during the manufacture of cement which comprises:

cooling said hot gases to the extent that at least a portion of said volatile compounds is condensed into powdery, solid form, separating coarse cement raw meal particles from said gases in a first separating stage, separating the powdery solid particles resulting from the condensation together with fine cement raw meal particles from said gases in a second separating stage, said powdery solid particles and said fine cement raw meal particles being of particle sizes less than 200 microns, mixing the particles separated in said first separating stage with the particles separated in said second separating stage in sufficient amounts to produce a mixture having the following composition:

Chlorides (as Cl)—3 to 20% by weight
   $SO_2$ and $SO_3$ combined—2 to 20% by weight
   $K_2O$—5 to 30% by weight
   $Na_2O$—2 to 20% by weight
   the balance being cement residues including CaO, $Al_2O_3$, $Fe_2O_3$ and $SiO_2$, and consolidating said mixture into solid shapes of larger area by passing said mixture between a pair of rolls at a pressure up to 6 metric tons per centimeter of roll width to produce shapes having a density of less than 2.7 g/cm$^3$.

2. A method according to claim 1 in which:
   said separated particles and cement particles are consolidated by briquetting.

3. A method according to claim 2 in which:
   said briquetting is accomplished in a roll press having molding cavities on the surface thereof.

4. A method according to claim 1 in which said consolidating takes place between a pair of smooth surfaced rolls to shape said particles into plate-like objects.

5. A method according to claim 1 which includes the step of:
   adding a binder to said particles before consolidating.

6. A method according to claim 1 which includes the step of:
   consolidating said particles in a plurality of briquetting stages.

7. A method according to claim 1 which includes the step of:
   moistening said particles before consolidating.

8. A consolidated briquette produced according to claim 1.

* * * * *